Jan. 5, 1937.  F. M. TRUMAN  2,066,375
AIRCRAFT AND THE CONTROL THEREOF
Filed April 15, 1933  7 Sheets-Sheet 1

Fig.1.

INVENTOR
Fred M. Truman
BY
ATTORNEYS

INVENTOR
Fred M. Truman
BY
ATTORNEYS

Jan. 5, 1937.  F. M. TRUMAN  2,066,375
AIRCRAFT AND THE CONTROL THEREOF
Filed April 15, 1933  7 Sheets-Sheet 5

Jan. 5, 1937.  F. M. TRUMAN  2,066,375
AIRCRAFT AND THE CONTROL THEREOF
Filed April 15, 1933  7 Sheets-Sheet 6

INVENTOR
Fred M. Truman
BY
ATTORNEYS

Patented Jan. 5, 1937

2,066,375

UNITED STATES PATENT OFFICE 2,066,375

AIRCRAFT AND THE CONTROL THEREOF

Fred M. Truman, Ambler, Pa.

Application April 15, 1933, Serial No. 666,378

4 Claims. (Cl. 244—83)

This invention relates to aircraft and the control thereof, and while certain aspects of the invention are of application in aircraft generally, the invention is particularly useful in the controlling of heavier-than-air machines, such as aeroplanes, gliders and the like, in which there are normally provided means for controlling the craft in roll, means for controlling the craft in yaw, and means for controlling the craft in pitch, each of said means normally comprising movable control surfaces, such as ailerons, rudder and elevators, respectively.

One of the primary objects of the invention is to simplify the controls of, and especially the operations of the pilot in controlling, such an aircraft.

Another important object of the invention is the provision of supporting means for carrying certain of the movable parts of the controlling mechanism, which supporting means and controlling mechanism are so constructed and relatively arranged that the supporting means, though normally fixed at a predetermined position or angular setting for a given installation, may in said given or in other installations be set at other positions or other angular relationships (especially with reference to the occupant's compartment or pilot's seat) as may be best suited to the convenience or preference of the operator, while at the same time the relative control positions of the main controlling element and the control surfaces are not altered and the normal controlling actions are not interfered with.

In general, the invention contemplates broadly a common or unified control means or element for operating, independently or conjointly, all three controlling means of the aircraft, that is, the three means for controlling the aircraft in three different senses; and the invention further contemplates the movable mounting of the common control means in such manner that it may be actuated in three different senses, directions, or planes, either separately or conjointly, for obtaining the three controlling effects required.

In carrying out this general purpose, the invention contemplates accomplishing it either by a control wheel or by a control stick, each of which as herein disclosed has certain particular advantages of its own; and the control connections may be of a rod and lever type, or of a rack and pinion or gear type, or of a lever and cable type, which respectively have specific advantages in different types or forms of aircraft.

The invention, furthermore, contemplates the attainment of one or more of the foregoing objects by an arrangement in which there is a manually operable control element for a plurality of control surfaces and controlling operations, which may be mounted on a movable column or formed as a movable column, or which may be mounted on a fixed column, the latter being adjustable, if desired, to various fixed positions, particularly different positions of angularity, with respect to the occupant's compartment or pilot's seat, as may be convenient or desirable.

More specifically, the invention contemplates a control element which is rockingly tiltable, preferably longitudinally and transversely of the craft, and otherwise movable, such as by rotation about its own axis, the invention furthermore providing different forms of mechanism to accomplish this purpose, one of which may involve the column itself being movable in said three respects, and another of which may involve a control element mounted on a fixed column in such way that the element itself is movable in said three respects. With any of such arrangements, the invention further provides for mounting the manually controllable means or element above the floor of a cockpit or occupant's compartment, as the sole element therein for effecting control movements of the craft in all three attitudes, whereas all the rest of the mechanism is removed from the cockpit or compartment or is in large part mounted below the floor thereof, where it is out of sight, out of the way, and out of danger of undesired fouling on or contact with baggage or passengers.

Further objects and advantages involve provision of a control means which requires less space for its operation over the complete range of control movements than is common in this art; the incorporation of readily adjustable or replaceable parts such as gears or the like for the purpose of adjusting the ratio of throw of the manual control element to the throws of the several control surfaces; the connection of the control with the control surfaces in such manner that the craft always responds in the direction of instinctive movement of the control element, which is not true as to all control movements of the present ordinary aircraft especially as to the rudder; the provision of control mechanism which is readily adaptable to the use of ultimate control connections either of the push-and-pull, the torque, or the tension type; the provision of a control arrangement which is readily adapted, with little change, to monoplane or multiplane craft; and the provision of a common manual control element which permits hand control of roll, yaw and pitch, simultaneously or separately, leaving the feet free to operate any other desired mechanism, such as brakes.

Other objects and advantages, both in general and in greater detail, will be evident to those skilled in the art or will appear from the following description, taken together with the accompanying drawings, in which drawings.

In Figures 1, 2, 3, 7, 9, 11, 12 and 14 the arrow F indicates the line of flight.

*First form of mechanism*

By reference first to the mechanism shown in Figures 1 to 8 inclusive, it will be seen that in an aircraft which comprises a body or fuselage 2, engine and propeller indicated at 3 and 4, undercarriage 5 and 6, wings 7 having ailerons 8, fin 9 with associated rudder 10, stabilizer 11 with its appended elevators 12, and cockpit or occupant's compartment 13, I have provided a common control element 14 (in this instance a wheel) which is located conveniently in front of the pilot's seat 15, and is mounted on a normally fixed, but preferably adjustable, column indicated in general at 16.

Figure 1:
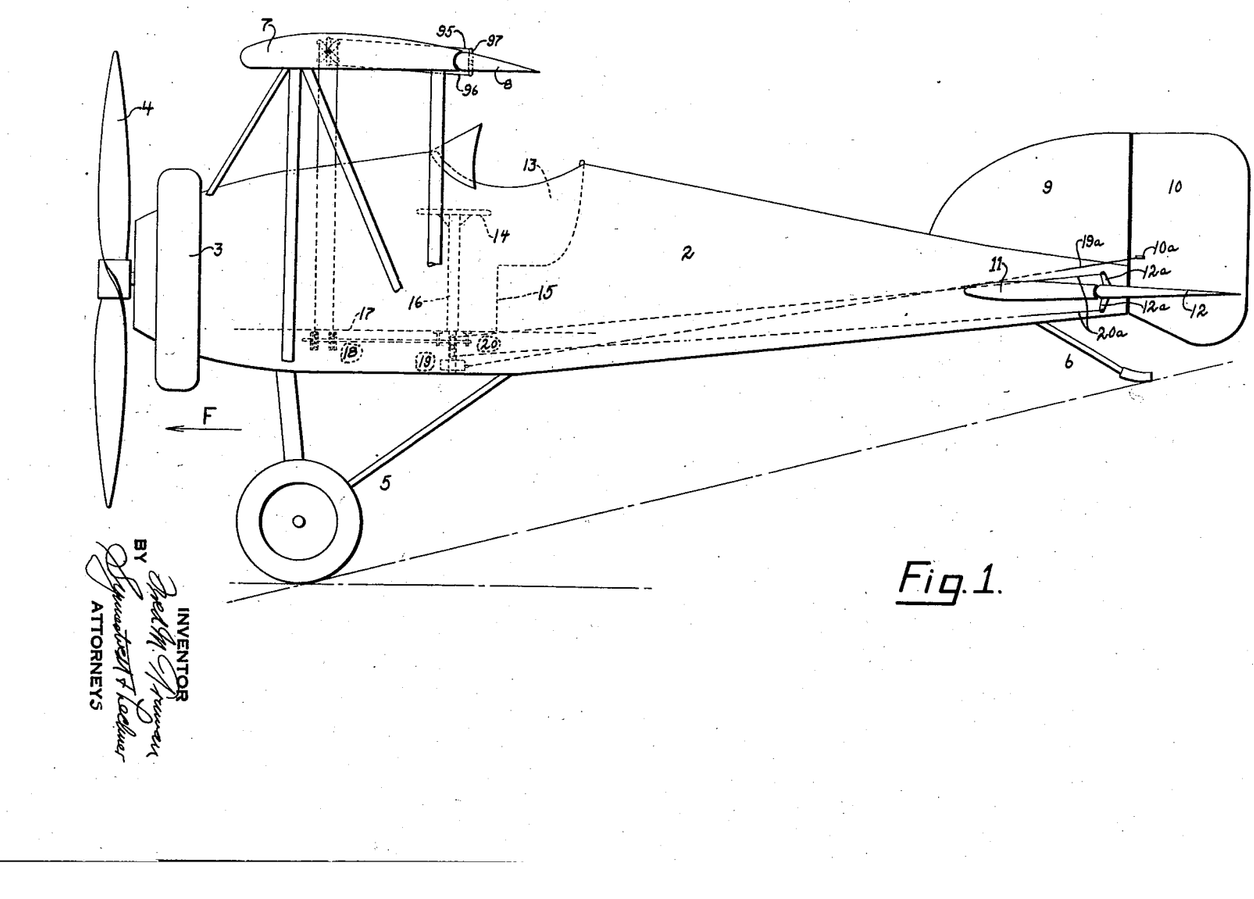
Figure 1 is a side elevational view of an aircraft, with parts of the craft including the lower wing omitted, illustrating one embodiment and setting of my improved controlling system.

From Figure 1 it will be evident that the only flight control protruding upwards in the cockpit above the floor 17 is the column 16 with its wheel 14. The control connections themselves, indicated generally at 18, 19 and 20, for ailerons, rudder and elevators, respectively, are all associated with the common control element 14 by connections, links, levers or the like, located below said floor 17.

Figures 2, 6:
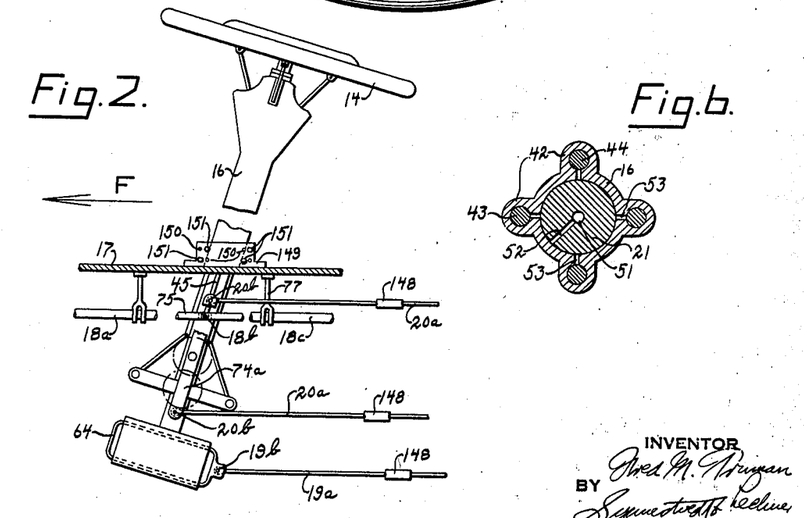
Figure 2 is a somewhat enlarged side elevational view of the common control element for the several surfaces and of the control connections thereto, and illustrating a different setting or mounting of the control element itself with its supporting means or column.
Figure 6 is a cross section of the control column as a whole taken on the line 6—6 of Figure 3.

In this form of mechanism, as seen in Figure 2, an aileron rock shaft or torque tube 18a extends longitudinally for connection with the bottom of the control column, a pair of rudder rods 19a (one of which is behind the other in this view) extend longitudinally for connection to the very bottom of the mechanism, and a set of elevator rods 20a also extend longitudinally to this general zone. It may be briefly pointed out here, although it will be brought out in detail later on, that each of these control means includes, at some point in its means of connection to the common control element, one or more joint means such as indicated at 18b, 19b and 20b, so constructed and arranged as to permit, without redesigning the control connections, the location of the common control column 16 in different fixed positions, particularly different positions of angularity, such as the vertical position shown in Figure 1 or the tilted position shown in Figure 2, as convenience or the desire of the pilot may dictate; all without destroying or interfering with the proper operative relationships between the common control wheel 14 and the control surfaces themselves.

Figure 3:
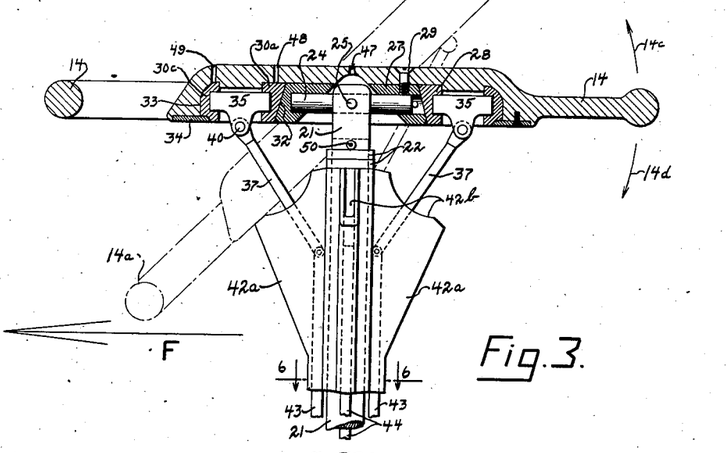
Figure 3 is a further enlarged side elevational view of the heart of the controlling mechanism of Figures 1 and 2, with certain parts broken away and others shown in section.
Figure 4:
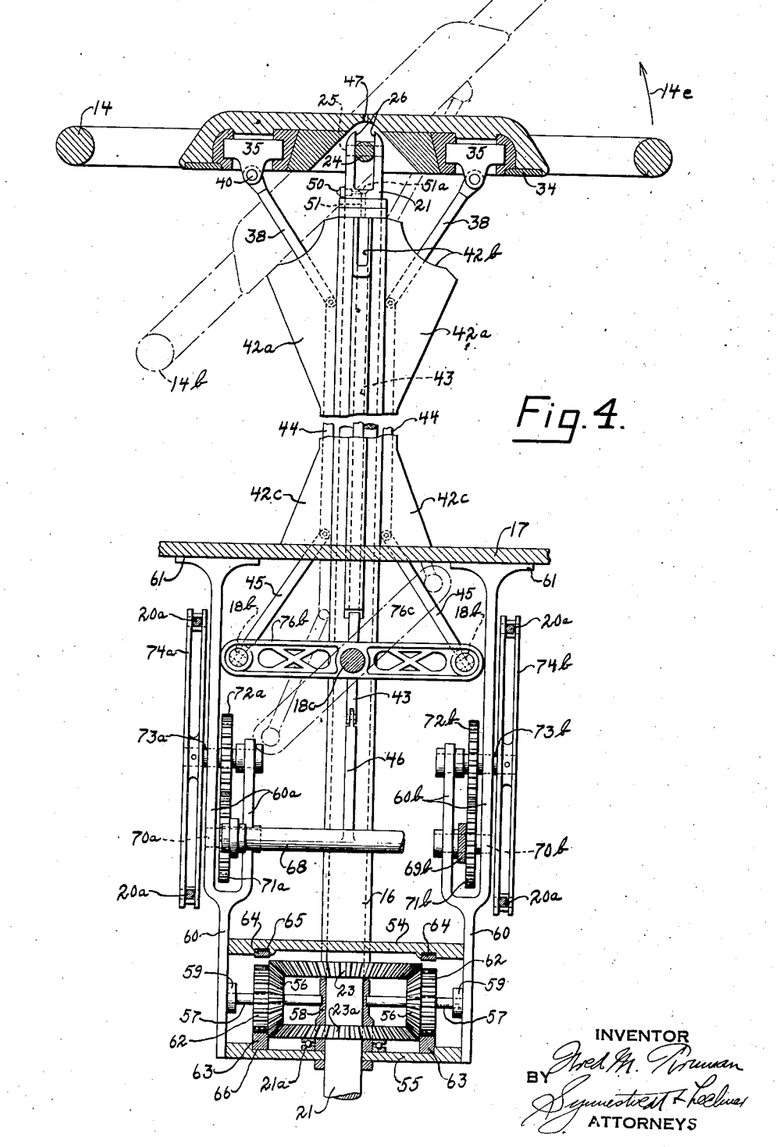
Figure 4 is a rear elevation of the mechanism shown in Figure 3.

Turning now to Figures 3 to 8 inclusive, which illustrate in detail the mechanism shown in general assembly in Figure 1, it will be observed that the wheel 14 is mounted at the top of the fixed column 16 by means of a rudder controlling shaft 21, this shaft being rotatably mounted in the fixed column or support 16, but held as against longitudinal, that is, vertical movement therein, as by means of the collar devices 22 at the top and one of the conical gears 23 at the bottom, a thrust bearing 21a being also preferably provided (Figure 4). The wheel 14 has a universal mounting on the upper end of said shaft or rod 21, by means of the intersecting pivots 24 and 25, the pivot 24 being mounted to rock about the pivot 25 as an axis, and the pivot 25 being mounted to rock in the fork ends 26 of the rod 21.

It will be observed from Figure 3 that the pivot pin 24 is inserted in a bearing block 27, carried centrally within the under side of the wheel 14, such insertion being by way of the bore 28; the bearing block 27 being held in place by means of suitable screws 29. Thus, with the wheel 14 in its neutral position as shown in full lines in Figures 3 and 4, or with the wheel tilted in the vertical longitudinal plane of the aircraft as indicated at 14a in Figure 3, or with the wheel tilted in a plane laterally of the aircraft, as indicated at 14b in Figure 4, if the wheel 14 is not turned about its own axis no effect is produced on the rudder, but in any of said tilting positions if the wheel be turned about its own axis the proper rudder control is produced, as will be described in greater detail hereinafter.

Figure 5:
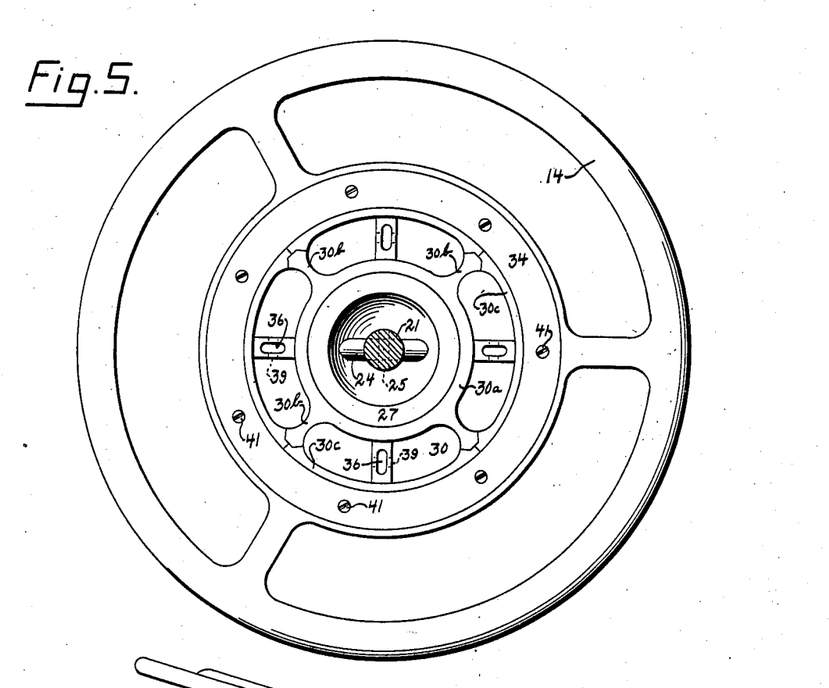
Figure 5 is a bottom plan view of the control wheel of the mechanism of Figures 1 to 4, with the upper end of the central connection to the wheel, which is the rudder connection, shown in section.

Before proceeding to the description of the connections between the common control means or wheel 14 and the three control surfaces, ailerons 8, rudder 10 and elevators 12, other structural details of the wheel itself (as best seen in Figures 3, 4 and 5) should be briefly described. Recessed in the under face of the wheel, and in surrounding relation to the fixed block 27, is an annular structure, indicated in general by the reference character 30 in Figure 5, said structure being composed of an inner ring 30a having peripheral arms 30b, and an outer ring 30c which is formed in four segments having a more or less interlocked relation with the arms or projections 30b of the inner ring, so that a general annular frame is provided for connection to the lateral and longitudinal controls.

This ring or frame, as a whole, is non-rotative, and since the wheel 14 must be rotatable there must be the capability of relative rotation between said wheel and said ring structure. Although the entire ring structure including the inner ring 30a and the outer ring 30c acts as a unit, the rotative mounting of the inner and outer ring parts, with relation to the wheel, may be separately provided as follows: for the inner ring 30a the annular shoulder portion 31 of the wheel and the conical peripheral surface 32 of the block 27 serve as a relatively rotatable mounting and as a means of retaining said ring in place; and for the outer ring structure 30c the same annular shoulder 31 and the inner peripheral surface 33 of the wheel plus the annular retaining plate 34 serve as the rotative mounting and the means of retaining said ring structure.

Between the inner and outer portions of the ring structure 30 are mounted four lugs 35, located in equi-spaced relation thereabout, the fore and aft lugs (seen in Figure 3) and the lateral lugs (seen in Figure 4) being apertured at 36 (see Figure 5), to receive, respectively, the upper ends of elevator control links 37 and aileron control links 38. The lugs are further apertured, as indicated at 39 in Figure 5, to receive the link connecting pins or pivots 40 which are seen in Figures 3 and 4.

In assembling this portion of the mechanism, the lugs 35 may be inserted in the recesses of ring 30a (as seen in Figure 3), the segments of outer ring 30c are then brought together so that their recesses (as also seen in Figure 3) receive the outer ends of the lugs 35, this assembly is then slipped down over the conical bearing block 27, as seen in Figure 3, the wheel 14 is slipped down over the assembly thus formed, the annular retaining plate 34 is moved up from below into its recess as shown, the upper retaining screws 29 are inserted from above, and the lower retaining screws 41 are inserted from below. The links 37 and 38 may then be connected to their control ring structure by inserting their pivot pins 40.

Turning now to the mounting column 16, which serves to movably mount the control wheel 14 and the various control connections, it will be seen from Figure 6 that this column is generally cylindrical or has a central bore to receive the rudder control rod 21 which also mounts the wheel 14. Externally of the column may be provided bearings at spaced intervals therealong, or more preferably continuous tubes 42 (which may be formed integral with the column) to carry the elevator and aileron control rods 43 and 44 respectively, all of said rods being longitudinally slidable in such bearings or tubes 42. It will be understood that in place of such rods 43 and 44 and the rudder rod 21, that I may employ hollow shafts or tubes or their equivalent.

As seen in Figures 3 and 4, the upper ends of the tubular guides 42 are flared radially outwardly as at 42a so as to serve also as guides for the connecting links 37 and 38, which latter have both an endwise and an oscillating movement in the slotted openings 42b of the guides 42a, upon fore and aft and lateral tilting of the wheel 14, as indicated by the arrows 14c and 14d in Figure 3 and 14e and 14f in Figure 4.

At the lower end of the column 16, the guides 42 for the elevator push-and-pull control rods 43 may terminate just a little below the floor 17, as seen in Figure 3, since these rods 43 are connected with the lowermost links 46 of the elevator control system at a zone well below the floor 17; whereas the guides 42 for the aileron push-and-pull control rods 44 are flared outwardly as at 42c in Figure 4, the latter guides serving to position the lower links 45 of the aileron control system. Thus the moving parts of the mechanism located above the floor 17 are for the most part housed, whereas the moving parts located farther down may be more or less open for inspection, adjustment, lubrication and repair, since such lower portions of the mechanism are not in position to be disturbed by the occupants in the cockpit.

For lubrication of the enclosed protected parts of the mechanism which are mainly above the floor 17 of the cockpit, I may provide lubricant apertures or channels 47, 48 and 49, in the top of the wheel 14, located respectively adjacent the universal joint device 24, 25 and the control ring structures 30a and 30c. Lubrication of the rudder control shaft or column 21 within the support column 16 may be readily effected by means of a lubricant fitting 50 (see Figure 3) connecting to a bored longitudinal passage 51, which latter may have radiating lubricant passages 52 (as seen in Figure 6) extending out to the inner surface of the column 16. The moving control rods 43, 44 within their tubes or other bearings 42 may similarly be lubricated, or more preferably they may be lubricated from the same lubrication system as employed for the rudder control rod 21, as by means of lubricant channels 53, extending from the bearing surface within the column 16 to the bearing surfaces within the tubes 42. Alternatively, all of the lubrication of all of the parts in the mounting column 16 may be effected by the upward extension of the oil passage 51 as indicated at 51a in Figure 4, into which lubricant may drip from the universal joint device 24, 25. For such lubrication of the moving parts in the mounting column as well as for the adequate lubrication of the universal joint device, it is desirable that the lubricant opening 47 be made sufficiently large that the spout of an oil can may be inserted therethrough and directed toward the ends of the joint devices 24, 25.

Referring again to Figures 3 and 4, the lower end of the column 16 may be extended well below the floor 17, and the rudder control rod 21 may be carried on down, through fixed supporting structure 54 and 55; a pair of conical or beveled gears 23 and 23a being mounted on the lower extension of the shaft 21 (gear 23 being fixed on the shaft for rotation therewith and gear 23a being floating with respect to the shaft). By using two such gears 23 and two cooperating gears or pinions 56 any considerable tendency toward end-thrust, or displacement of the gears or other parts, is obviated, and the proper and smooth differential action of the two pinions 56 is assured, although it will be understood that the essential operation of the control could be effected by the fixed gear 23 alone.

The gears 56 are mounted on shafts 57, which are carried in a floating bearing 58 surrounding the shaft 21 and in bearings 59 which are supported on the fixed frame members 60; the latter extending from the fixed structure 54 and 55 upwardly to the floor 17 where they are attached as by brackets 61. Thus a firm and rigid interbracing of the entire supporting structure is afforded.

The gears 56 carry with them a pair of spur gears 62 which mesh with racks 63, the latter being secured in links or frames 64 which are longitudinally slidable in the guideways 65 and 66, formed respectively in the fixed structure 54 and 55.

It will now be seen from Figure 4 that if the wheel 14 be given a clockwise controlling movement (when viewed in top plan), the left hand link or frame 64 will move rearwardly and the right hand link or frame 64 will move forwardly. The resultant motions will be transmitted to the rudder 10 by means of the left hand and right hand control rods or wires 19a (Figure 3) which are respectively connected to the left and right links 64 by means of pivot pins 19b, as hereinbefore described with reference to Figures 1 and 2. Thus a clockwise turning of the control wheel, viewed in plan, will swing the rudder to the right, for use in a right turn; and a counter-clockwise turning of the wheel 14 will swing the rudder to the left, for a left turn, similar to the direction of movement of the usual steering wheel in an automobile.

The control connections from the tiltable but non-rotative ring structure 30, to the elevators, through the links 37, rods 43 and links 46, are by means of the mechanism now to be described.

The lower links 46 are connected respectively to transverse bars or rods 67 and 68, located respectively fore and aft of the axis of the control column; these bars serving to interconnect the left and right rocking levers 69a and 69b. Said levers are rockingly mounted on short shafts 70a and 70b which are journaled in the bifurcations 60a and 60b of the framework 60.

Gears or pinions 71a, 71b are mounted respectively on said shafts 70a and 70b, to move fixedly with their respective rocking levers 69a and 69b. When so actuated by their levers, the lower gears 71a and 71b similarly actuate the upper gears 72a and 72b; the latter gears being fixed on short shafts 73a and 73b, which are also journaled in the aforementioned bifurcated framing, and which carry at their outer ends, respectively, the rocking frames or levers 74a and 74b.

At the left hand side of the craft, the elevator control rods or cables 20a, 20a are connected respectively to the upper and lower ends of the rocking frame 74a, by pivots indicated at 20b. At the right hand side of the machine the elevator control cables 20a, 20a are similarly connected to the rocking frame or lever 74b.

As seen in Figure 1, the ultimate connection of the elevator control rods or cables 20a to the elevator 12 is by means of the control horns 12a; and the final connection of the rudder control 19a may be by means of a control horn 10a. The control movements of the rudder have been previously described. The control movements of the elevators will also be clear from the foregoing description of the several connections between the lower links 46 and the aileron control rods 20a. It is clear from Figure 3 that as the wheel 14 is tilted forwardly, as in the direction of the arrow 14c, the levers 69a and 69b are moved, for example, to the position 69c (indicated in dot and dash lines) which movement through the intermediation of the gearing moves the rocking frames 74a and 74b into a position indicated in dot and dash lines at 74c. Thus the upper control members 20a to the elevators are moved rearwardly and the lower control members 20a are moved forwardly, causing the machine to nose downwardly. The control movements of the ailerons are thus also in accordance with the pilot's instinctive reactions.

Turning now to the connections from the wheel 14, by way of the links 38, rods 44 and lower links 45, and thence to the ailerons, it will be seen that these connections are completed as follows:

The links 45 are connected to longitudinally extending bars or rods 75, one positioned at each side of the control column, by means of universal joints 18b (see Figures 2 and 4); the forward and rearward ends of the bars 75 being interconnected by transverse rocking levers 76a and 76b. The longitudinal bars 75 and the transverse rocking levers 76a and 76b thus make a frame which is mounted on the rock shaft 18c at the rear of the control column, the latter shaft extending longitudinally and being rockingly mounted or journaled in suitable support means 77; while in front of the control column the said frame is mounted on the rock shaft 18a, which is similarly journaled in support means 77a.

The frame, composed of bars 75 and fore and aft transverse rocking levers 76a and 76b, therefore may rock in a transverse vertical plane, and transmit the rocking motion to the central longitudinal rock shafts 18a and 18c, either of which shafts may be used for making connection to the ailerons, although in the embodiment shown in Figure 1 the forward shaft 18a is used for this purpose. It will readily be seen from Figure 4 that a rocking or tilting of the control wheel 14 to the left, as indicated by the arrow 14e, will tilt the rock levers 76a and 76b to the position indicated in dot and dash lines at 76c, which effects a similar rocking movement of the forwardly extending rock shaft 18a. Tilting movement of the wheel in the direction of the arrow 14f effects an opposite rocking of said shaft.

Figures 7, 8:
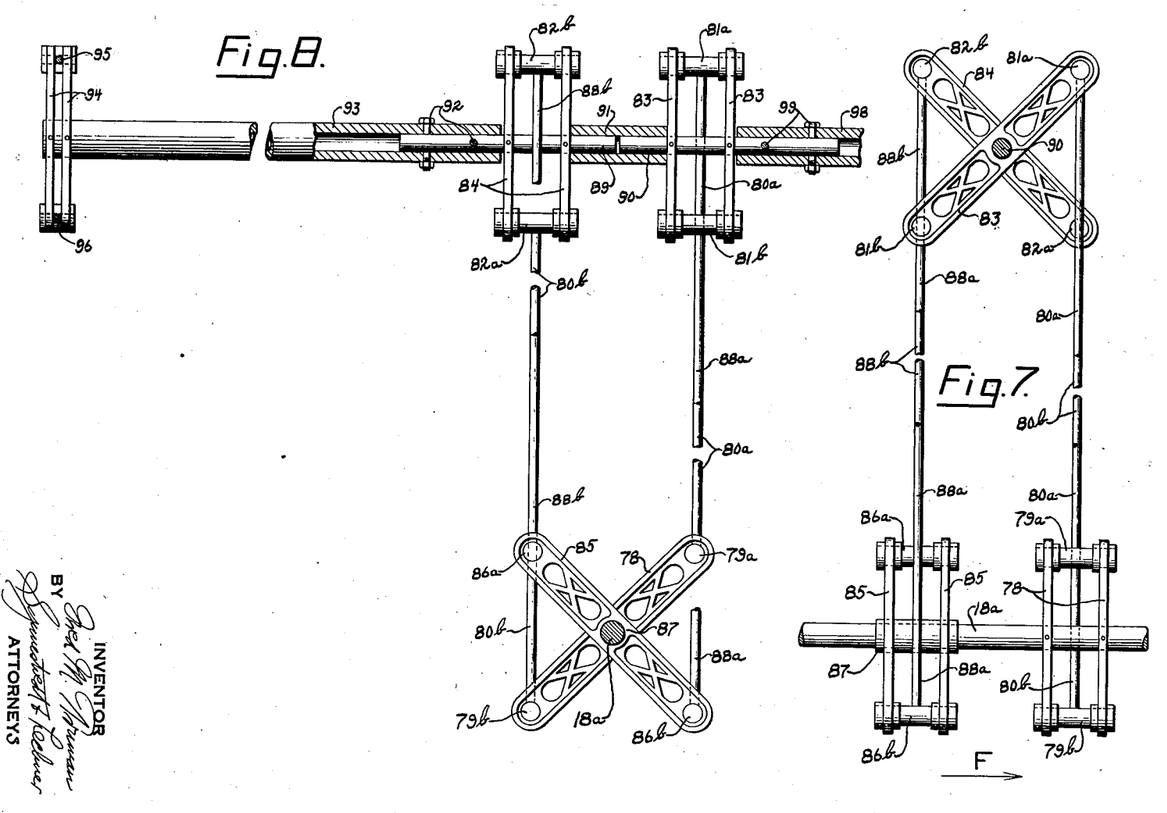
Figure 7 is a right side elevational view of the forward part of the control mechanism of Figure 1 (in other words, viewed from the side opposite to Figure 1), showing the means for carrying the control connections from beneath the floor up to the wing for aileron actuation.
Figure 8 is a fragmentary rear elevational view of the mechanism shown in Figure 7, that is, as viewed from the cockpit of the machine of Figure 1.

By reference to Figure 1, and more especially to the details shown in Figures 7 and 8, it will be seen that the rocking movements of shaft 18a are transmitted from a plane below the floor 17 up to the plane of the wing (in the type of machine illustrated) by a lower system of levers or frames which rock in vertical planes transverse the aircraft, an upper system of levers or frames which rock in vertical planes lying longitudinally of the craft, and interconnecting links or rods. In Figure 7 is seen a lower frame comprising two levers 78 mounted fast on the shaft 18a and two interconnecting members or bars 79a and 79b. A rod 80a is connected at its lower end to bar 79a and at its upper end to a bar 81a of an upper rocking frame; while a second rod 80b is connected at its lower end to the bar 79b and at its upper end to a bar 82a of a second upper frame. The first mentioned upper frame (that is, the frame having a bar 81a) is completed by a bar 81b and two rocking levers 83. The second mentioned upper frame, having the bar 82a, is completed by the bar 82b and two rocking levers 84.

Turning now to the second lower control frame, it will be seen from Figure 7 that this comprises two rocking levers 85, interconnected at their ends by the bars 86a and 86b, and mounted to rock freely about the control shaft 18a by means of a floating mounting collar or sleeve 87.

A control rod 88a, connected at its lower end to the bar 86b, extends upwardly and is connected at its upper end to the bar 81b of the second upper frame. This part of the assembly is completed by the rod 88b, which is connected at its lower end to the bar 86a and at its upper end to the bar 82b of the first mentioned upper frame.

It will now be seen that the rocking levers 78 of the first lower frame will, through the rods 80a and 80b, rock the levers 83 and 84 of the two upper frames, in opposite senses and thus turn the two upper shafts 90 and 89 in opposite directions, since the two upper frames are respectively fixed one on each of said shafts. The further interconnection of the two upper rocking frames or assemblies through the intermediation of the rods 88a and 88b and the floating lower frame or lever assembly 85 supplies simply a secondary operating interconnection between the two aileron actuating shafts 89 and 90, which makes possible the substitution of tension cables only in place of the push-and-pull rods, if desired; or if the rods are used (as shown) this secondary operating interconnection simply assures the proper operation of both ailerons, even if one or the other of the main actuating rods 80a, 80b should break.

Referring more particularly to Figure 8, it will be seen that the aileron rods 89 and 90 are mounted for free, and reverse, rocking movements in the fixed mounting tube or flange 91. The shaft 89 is connected as at 92 to a torque tube 93 which extends out through the left wing of the aircraft, where its ultimate connection to the left aileron 8 is accomplished by means of a frame 94, upper and lower rods or cables 95, 96, and the usual control horns 97. A similar connection is made to the aileron on the right wing, by means of a torque tube 98 which is connected with the shaft 90 as by bolts indicated at 99; the connections to the right aileron being not shown as they are similar to the connections previously described.

By following out the connections between the wheel 14 (Figure 4) and the left aileron 8 it will be seen that tilting the wheel to the left, as indicated by the arrow 14e will raise the left aileron 8 and thus tend to depress the left wing. At the same time, the right hand aileron is moved in the opposite sense, and the usual control in roll is effected; the tilting of the wheel in the direction of desired lateral inclination being in accordance with instinctive reaction. Similarly, the opposite effect is produced by tilting the wheel in the direction of the arrow 14f of Figure 4.

In the form of mechanism just described it will be observed that the control connections and the operating mechanism therefor are so constructed, positioned and arranged that the control column may be mounted at various fixed positions of adjustment. For example, as seen in Figure 2, the column 16 may be mounted in a tilted position if desired. In such event, the angularity between the control column and its associated parts on the one hand and the leads or connections going to the rudder, elevators and ailerons on the other hand, is accommodated by the universal joint connections 18b of the links 46 to their shafts 75, the pivotal connections 19b of the rods 19a with their operating frames 64, and the pivotal connections 20b of the rods 20a with their rocking levers 74a, etc.; and if desired the length of the several control rods may be made readily adjustable as by means of adjustment devices 148.

To secure the column 16 in various angular mounting positions, I may employ the mounting bracket 149 (shown in Figure 2) having a plurality of apertures 150, through certain of which bolts or other securing devices 151 are inserted, the location of these bolts being dependent upon the angle at which the column 16 is to be mounted.

Figure 3A:
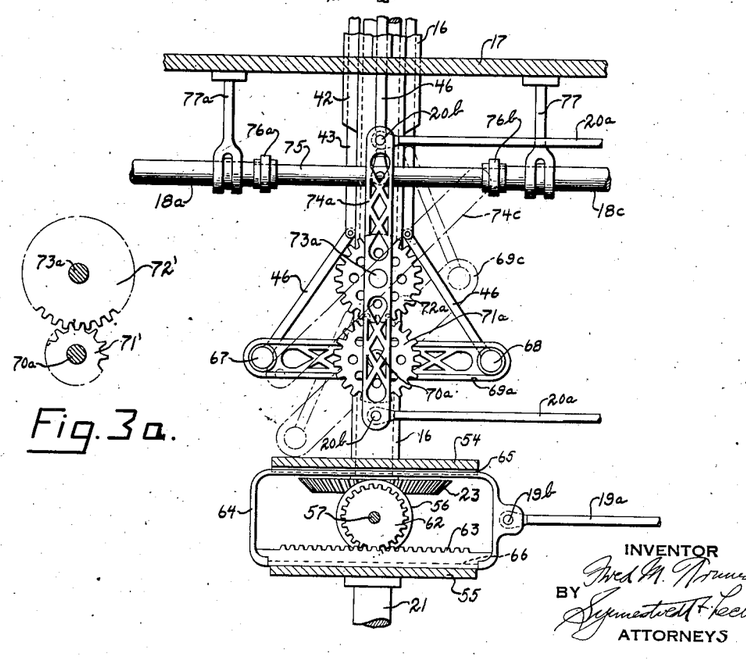
Figure 3a is a side elevational view of a modification of a detail of the mechanism of Figure 3.

The mechanism further lends itself very readily to any desired changes in the ratio between the movements of the control element or wheel 14 and the movements of the control surfaces themselves. For example, in Figure 3a, I have illustrated a substitute pair of gears 71' and 72', which may be mounted on the shafts 70a and 73a in place of the gears 71a and 72a of Figure 3. By this means the throw or movement of the ailerons resulting from a given throw or tilting movement of the control wheel may be readily adjusted. It will be understood that similar gear changes may be made, or different lengths of levers may be employed, for modifying the action of the rudder and ailerons.

Second form of mechanism

Figures 9, 10, 11:
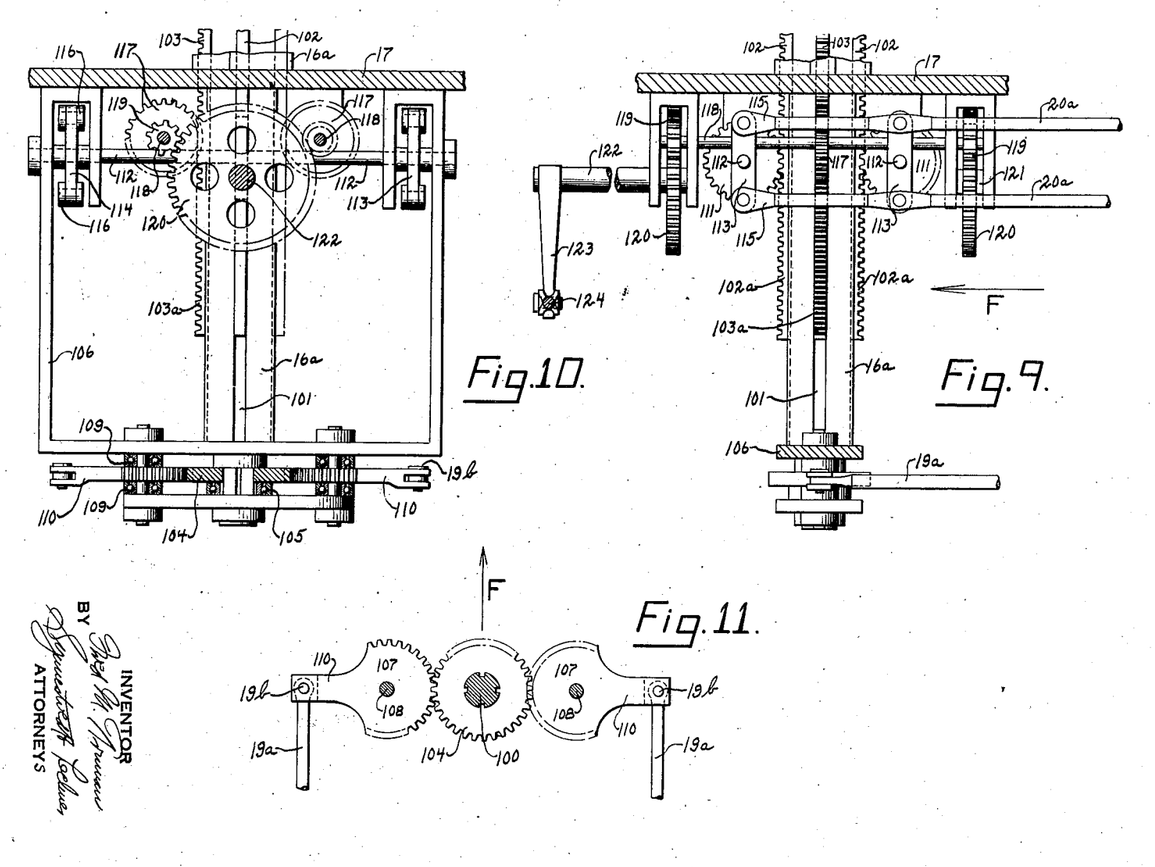
Figure 9 is a side elevational view similar to the lower portion of Figure 3, but illustrating a modified form of mechanism for transmitting the control movements from the common control element to the several surfaces, this form being particularly adapted to arrangements where the aileron control connections may pass laterally outwardly into the lower wing of a biplane type of aircraft.
Figure 10 is a front elevational view of the mechanism of Figure 9.
Figure 11 is a bottom plan view of the rudder control connections of Figure 10.

In the second general form of mechanism for carrying out my invention, as illustrated in Figures 9 to 11 inclusive, I am enabled to dispense with the lower push-and-pull links (such as used in Figures 3 and 4), eliminate a number of levers, readily employ ball bearings for the various shafts, and render that portion of the mechanism which is below the floor much more compact in form.

In this form of mechanism, the main column 16a may be of plane tubular form, housing the rudder controlling shaft 100, the said tube being externally formed with four slots 101 serving as guideways for the sliding control rods 102 for the elevators and 103 for the ailerons. These rods are continued down beneath the floor in the form of racks 102a, 103a.

The rudder operating shaft 100 may be keyed at the bottom to a gear 104, the said shaft and gear being mounted in suitable ball bearings 105; a simple frame structure 106 being provided to support the lower part of the mechanism. The gear 104 engages with a pair of gear segments 107, whose shafts 108 may be journaled in ball bearings 109, and these segments have arms 110, to which the rudder control rods 19a are connected by pivots 19b.

For the elevator control, the racks 102a engage gears 111, which are fast on shafts 112, each such shaft carrying a pair of levers 113, 114; the levers 113, on the left side of the craft being connected in tandem by links 115, and the levers 114 on the right side of the craft being connected in tandem by similar links 116. At the left side of the craft, an upper elevator rod 20a and a lower elevator rod 20a are respectively connected to the upper and lower ends of the rearmost lever 113, or they may be formed as direct continuations of the links 115, as shown in Figure 9. A similar pair of rods 20a is connected at the right side of the craft to the levers 114 or to their connecting links 116.

For operation of the ailerons, the racks 103a engage gears 117, which are respectively fixedly mounted on shafts 118. These shafts extend in a fore and aft direction and fixedly carry at their extreme ends the pinions 119 which engage gears 120, the rear gear 120 (in Figure 9) being mounted on a shaft 121 and the forward gear 120 being mounted on a shaft 122. these shafts thus correspond respectively to shafts 18c and 18a of Figure 3, and the connection to the ailerons may be taken from either of these shafts.

As illustrated, the aileron connection is taken from the shaft 122, by means of a depending arm or lever 123, and in this instance it is located beneath the floor 17 in a position approximately on a level with the wing of a low wing monoplane, or with the lower wing of a biplane, and the lateral connection to the ailerons may be made by means of a rod 124, extending out through the wings; although it should be understood that the mechanism shown in Figures 7 and 8 could readily be associated with the shaft 122, for actuation thereby.

*Third form of mechanism*

Figures 12, 13, 14:
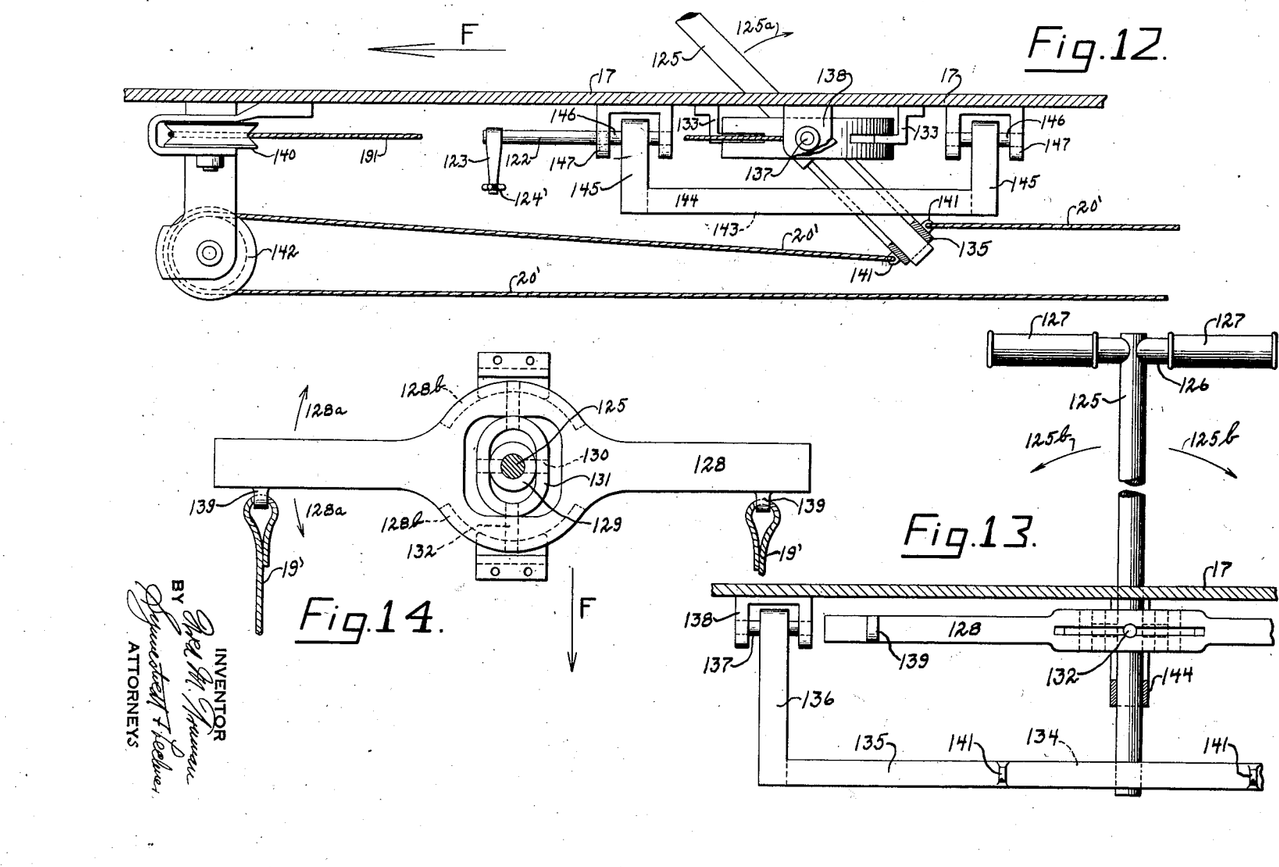
Figure 12 is a fragmentary side elevational view partly in section showing a third form of mechanism embodying the invention, to wit: the stick, lever, and cable form of mechanism, this illustration being comparable with and taking the place of the mechanism as shown in Figure 3 or Figure 9.
Figure 13 is a front elevational view of the mechanism of Figure 12, with certain parts omitted and others shown in section.
Figure 14 is a top plan view of part of the control connections to the rudder, and with the control stick of Figure 13 shown in section.

Turning now to the third form of mechanism embodying the invention, as illustrated in Figures 12 to 14 inclusive, it will be seen that this is of an extremely light and simple type, being well adapted for use in small aeroplanes or in light weight gliders. Here the control column 125 is itself made movable in three senses, to wit: it may be turned about its own axis for actuating the rudder, it may be moved forwardly and rearwardly in the plane of the arrow 125a (Figure 12) for actuating the elevators, and it may be actuated laterally in a transverse plane, as indicated by the arrows 125b (Figure 13) for actuating the ailerons.

Instead of a wheel, the column 125 is provided with a bar or handle 126, preferably provided with convenient and comfortable hand grips 127.

The column or stick 125 is the only part of the mechanism which projects above the floor 17. It is mounted by a universal joint in a rudder bar 128. As seen in Figure 14 the stick 125 is secured in a socket 129, carried by transverse pivot pins 130 in a yoke 131, the latter being pivoted on longitudinal pivots 132 in the rudder bar itself.

The stick is thus capable of tilting in any direction, without disturbing the position of the rudder bar 128, but if turned about its own axis (either when upright or when in any position of tilt) it turns the rudder bar in the plane of the arrows 128a. The bar itself is in turn definitely located and positioned by means of the circular grooves or peripheral recesses 128b, into which are fitted the supporting and positioning brackets 133 which are secured fast on the bottom of the floor 17. This assembly serves also to mount the center of the universal joint of the stick at a fixed point.

It will be observed that the connections from the rudder bar 128 to the rudder will produce, for a given bar movement, a rudder movement which is diametrically opposite to the rudder movement normally produced with the ordinary foot operated rudder bar or rudder pedals of the usual aeroplane control system. This effect is accomplished by hooking the rudder control cables 19' on to the front of the rudder bar as by means of the apertured lugs 139, and then passing said cables forwardly, thence around pulleys 140, and finally rearwardly to the rudder. The result of this arrangement is that the control bar 126 with its hand grips 127 is turned, just as wheel 14 of the previously described constructions would be turned, in the direction in which it is desired to turn the machine. This is the direction in which the steering bar of an ordinary sled is turned for steering, and is the instinctive direction for operating the control bar 126 of the control stick.

For the control of the elevators, it will be observed that the lower end of the control column or stick slidably engages a slot 134 in a U-shaped yoke 135, the said yoke lying in a transverse plane and having its upright legs 136 (only one of which is shown) mounted on pivot pins 137 which are supported in brackets 138, the axis line of the pivots 137 being positioned to intersect the center of the universal joint which mounts the control stick. By this arrangement, longitudinal movement of the stick as seen in Figure 12 swings the yoke 135 fore and aft about the axis 137 which is concentric to the longitudinal pivot axis of the stick, and this effect will be produced regardless of the lateral tilting position of the stick.

The connections from the yoke 135 to the elevators are, as in the case of the rudder, made by means of cables. The cables 20' are connected to the yoke 135 by fore and aft lugs 141, there being right and left lugs for the right and left elevators, as seen in Figure 13. In order to get the proper elevator movements, each cable 20' connected to the forward lug 141 is passed over a pulley 142 and thence rearwardly to the lower control horn of the elevator.

Turning now to the control of the ailerons, it will be seen that this is very similar to the control for the elevators. Intermediate the universal joint of the stick and the lower end of the stick, the stick is slidably engaged in a slot 143 of a longitudinally extending yoke 144, the upright legs 145 of which are mounted on pivot pins 146 which are supported in brackets 147, the axis line of these pins being in longitudinal alignment with the pivot 132 of the universal joint for the stick. Thus, regardless of the longitudinal tilting position of the stick 125, lateral movements of the stick in the directions of the arrows 125b will suitably rock the yoke 144 and thence the pivots 146.

Either pivot 146 may be extended for suitable connection to the ailerons, and in this case the forward pivot 146 is extended to form a shaft 122 (similar to that in Figure 9) on which is carried a rocking arm or lever 123, to the lower end of which are connected aileron operating tension cables 124'. In this instance, the left hand cable 124' (which is the one shown in Figure 12) would be connected to pull upwardly upon the left hand aileron when the stick 125 was tilted toward the left; and the right hand cable (not shown) would be connected to the right hand aileron to pull it upwardly when the stick 125 was tilted toward the right. To complete the system it is only necessary that the lower control horns of the right and left ailerons be interconnected by a cable passing forwardly from each aileron and then transversely across the machine. Such cable interconnection between right and left ailerons is known and need not be further described or shown in detail.

*General summary as to all forms of the mechanism*

From the detailed description of the several forms of mechanism, it will be evident that the general objects and advantages stated in the fore part of the specification are attained by any of the illustrated forms of construction, and especially that the invention provides a unified control system which is easier to operate than those heretofore in use; that the actual throws of the various control surfaces with respect to the several movements of the control member are readily adjustable; that the control surfaces are in all instances and under all circumstances so connected up and actuated by the common control that the craft responds to the direction applied at the control element itself; that the mechanism requires only the hands to operate it, thus allowing the feet to operate the brakes when landing or to operate any other controls that may be operated by them at any time; that the mechanism is easy to assemble; and that the cabin or cockpit is freed of a number of moving parts as compared with ordinary practice.

*Summary of specific advantages of first form*

In addition to the general advantages, the first form of mechanism obviously has decided advantages in that most of the moving parts, above the floor, are encased in a stationary housing; thus further that less space is required to operate the control through its complete range of throw; that the location of the control element is readily adjustable, and this without interference with or substantial modification of the control connections; and that a novel and convenient form of lubricating the enclosed moving parts is provided.

*Summary of specific advantages of second form*

Some of the particular advantages of the second form are: that it is more compact in form and lighter in weight; that the adjustments of ratios may be even more readily made; that friction is reduced to a minimum; and that a number of the advantages of the first form are also retained, such as the lubrication, the housing of the moving parts below the floor, etc.

*Summary of specific advantages of third form*

Specifically, this form of the mechanism involves the advantages that parts similar to the usual stick and rudder bar can be employed and yet the rudder bar need not be operated by the feet, and is in fact located out of the way beneath the floor; that the hand bar on the stick is moved in the instinctive direction for control either right or left, in place of the common arrangement on aircraft, which is difficult to become accustomed to; that this is the simplest, lightest in weight, least expensive, and easiest to install, of the three forms; and that all the connections are made to all the control surfaces by means of light tension cables; rods, gears and certain other moving parts being eliminated.

However, as to the use of tension cables, it should be observed that they may also be substituted in the first and second forms of mechanism, in place of the rods and torque tubes there shown, although the said rods and tubes are peculiarly adapted to large machines with heavy operating loads.

I claim:—

1. An aircraft control assembly, adapted to be coupled to ailerons, elevator and rudder, comprising a control stick tiltable in all directions and having operating means coupling it with the ailerons and elevator, a rudder bar, a universal joint for so tiltably mounting the control stick upon the rudder bar and constructed to transmit rotation of the stick upon its own axis to said bar, and an external annular groove on the rudder bar, with a fixed support engaging said groove to provide for oscillation of the rudder bar in its horizontal plane and to fix the said bar and thus the control stick as against bodily horizontal and vertical displacement.

2. An aircraft control system comprising, in combination with the ailerons, elevator and rudder, a normally upright control column, a generally horizontal rudder bar, means pivotally mounting said rudder bar intermediate its ends for rotative movement in its horizontal plane and cooperating therewith to restrain movements in other planes, an upright aperture through said rudder bar through which said column extends, a universal joint mounting and securing said column to said rudder bar comprising a ring pivotally mounted in said aperture on a horizontal axis lying in the plane of the bar and pivotally carrying said column on a horizontal axis at right angles to that first mentioned, a yoke pivotally suspended from an axis aligned with the first mentioned axis of the universal joint, a second yoke pivotally suspended from an axis aligned with the second mentioned axis of the universal joint, means of sliding engagement between said column and said yokes, whereby each of said yokes and said rudder bar can be independently and conjointly operated by movements of said column, and operating connections from the ailerons to one of said yokes, from the elevator to the other of said yokes, and from the rudder to said bar.

3. An aircraft control system comprising, in combination with the ailerons, elevator and rudder, a normally upright control column, a generally horizontal rudder bar, means pivotally mounting said rudder bar intermediate its ends for rotative movement in its horizontal plane and cooperating therewith to restrain movements in other planes, an upright aperture through said rudder bar through which said column extends, a universal joint mounting and securing said column to said rudder bar comprising a ring pivotally mounted in said aperture on a horizontal axis lying in the plane of the bar and pivotally carrying said column on a horizontal axis at right angles to that first mentioned, a yoke pivotally suspended from an axis aligned with the first mentioned axis of the universal joint, a second yoke pivotally suspended from an axis aligned with the second mentioned axis of the universal joint, means of sliding engagement between said column and said yokes, whereby each of said yokes and said rudder bar can be independently and conjointly operated by movements of said column, and operating connections from the ailerons to one of said yokes, from the elevator to the other of said yokes, and from the rudder to said bar, the aileron connections being coupled to produce lateral tilting of the craft corresponding to lateral tilting of the column on its universal joint, the elevator connections being coupled to produce longitudinal tilting of the craft corresponding to longitudinal tilting of the column on its universal joint, and the rudder connections being coupled to produce directional turning of the craft to correspond to the direction of rotation of the column about its own axis.

4. An aircraft control system comprising, in combination with the ailerons, elevator and rudder, a normally upright control column, a generally horizontal rudder bar, means pivotally mounting said rudder bar intermediate its ends for rotative movement in its horizontal plane and cooperating therewith to restrain movements in other planes, an upright aperture through said rudder bar through which said column extends, a universal joint mounting and securing said column to said rudder bar comprising a ring pivotally mounted in said aperture on a horizontal axis lying in the plane of the bar and pivotally carrying said column on a horizontal axis at right angles to that first mentioned, a yoke pivotally suspended from an axis aligned with the first mentioned axis of the universal joint, a second yoke pivotally suspended from an axis aligned with the second mentioned axis of the universal joint, means of sliding engagement between said column and said yokes, whereby each of said yokes and said rudder bar can be independently and conjointly operated by movements of said column, and operating connections from the ailerons to one of said yokes, from the elevator to the other of said yokes, and from the rudder to said bar, the aileron connections being coupled to produce lateral tilting of the craft corresponding to lateral tilting of the column on its universal joint, the elevator connections being coupled to produce longitudinal tilting of the craft corresponding to longitudinal tilting of the column on its universal joint, and the rudder connections being coupled to produce directional turning of the craft to correspond to the direction of rotation of the column about its own axis and comprising rudder cables extending forwardly from said bar and thence around supporting devices rearwardly to the rudder.

FRED M. TRUMAN.